Dec. 25, 1956  J. H. STANBURY  2,775,254
ELECTROMAGNETIC DEVICES FOR CONTROLLING FLUID PRESSURE
Filed Aug. 29, 1952
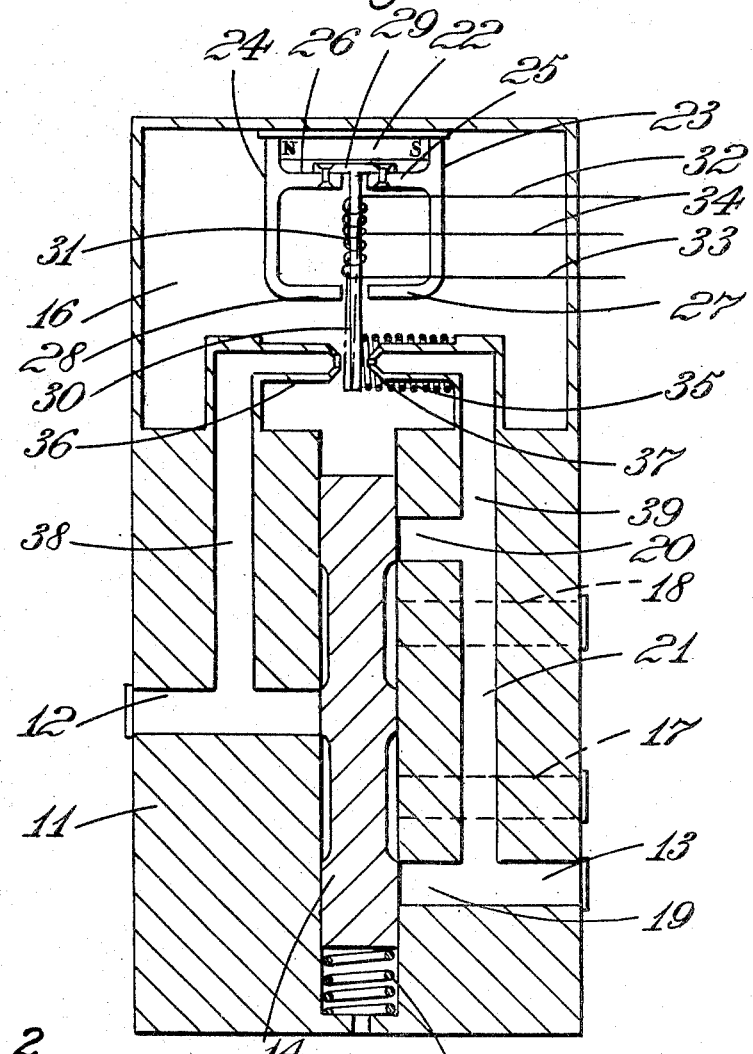
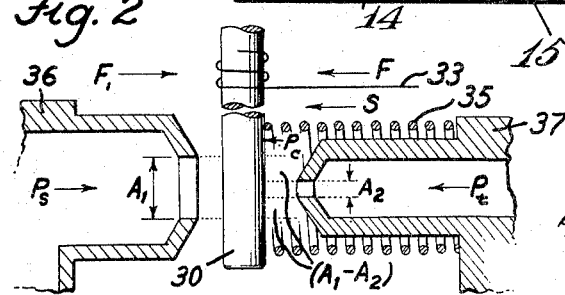
INVENTOR
John H. Stanbury
By: Watson, Cole, Grindle & Watson
ATTORNEYS

United States Patent Office 2,775,254
Patented Dec. 25, 1956

2,775,254

ELECTROMAGNETIC DEVICES FOR CONTROLLING FLUID PRESSURE

John Herbert Stanbury, Gloucester, England, assignor to British Messier Limited, Gloucester, England, a British company Application August 29, 1952, Serial No. 306,995

Claims priority, application Great Britain September 5, 1951

3 Claims. (Cl. 137—82)

This invention comprises improvements in or relating to electro-magnetic devices for controlling fluid-pressure circuits.

It is an object of the present invention to provide a device of the kind described which is of improved sensitivity compared with known devices.

It is known to make an electro-magnet control a reed which overlies an aperture through which a pressure fluid is flowing so that the pressure of the fluid behind the aperture is varied in accordance with the electrical current and to use the resulting variation of pressure for operating a valve which controls another fluid pressure circuit. Such a device is not very sensitive, however, to small changes of current.

The present invention comprises, in a electro-magnetic device for controlling a fluid-pressure circuit, the combination of a pressure-chamber, an inlet aperture thereto, an outlet aperture therefrom, means to supply fluid under pressure to the inlet aperture so as to maintain a flow of fluid through the chamber, an electro-magnet having a movable armature arranged to partially obturate the inlet and outlet apertures and so movable that movement to increase the effective size of the aperture simultaneously decreases that of the other and vice versa, so that the pressure in the pressure chamber may be varied by altering the current supply to the electro-magnet. In this way the effect of any movement of the armature upon the fluid pressure is much increased. If the armature moves to close the inlet and open the outlet, there is a pressure fall in the control chamber which is much greater than if the inlet only was reduced, and on the other hand if the armature moves to reduce the outlet it simultaneously increases the inlet and there is a pressure rise which is much greater than if one factor only were affected.

The device may have also a fluid-pressure control valve, ports controlled by the valve, and an operating piston for the valve, which piston is subject to the pressure in the pressure chamber, so as to move the valve and alter the distribution of pressure-fluid to the said ports in accordance with the pressure in the pressure chamber.

Preferably the area of the inlet aperture to the pressure chamber is several times greater than the area of the outlet aperture, the armature is movable towards and away from the apertures and a biasing member (for example a spring) is provided which exerts such a force on the armature as to tend to balance the force exerted upon it by the flow of incoming liquid. Under these conditions it can be shown that the pressure in the pressure chamber will vary more or less proportionately to the force exerted on the armature by the electro-magnet.

The following is a description by way of example of one construction of electro-magnet control valve as applied to a hydraulic control circuit, and illustrated in the accompanying drawing, in which Figure 1 is a diagrammatic representation of an apparatus in accordance with the invention in longitudinal section, and Figure 2 is a schematic representation of the forces developed in the control chamber.

A valve body 11 having a central bore to contain a piston valve 14 is provided which has in one side an inlet 12 leading to a central port for the piston valve 14 and on the other side two outlet ports 17, 18, one or the other of which is connected to the hydraulic pressure according to whether the piston valve 14 moves to one side or the other of its central position. There are also two exhaust ports 19, 20 opening into the bore which contains the piston valve and connected to the hydraulic reservoir via the bore 13. When the one outlet port, say 17, is connected to pressure the other (in the case supposed 18) will be connected by the piston valve to the exhaust, and vice versa. In one end of the bore there is a spring 15 which urges the piston valve toward one end of its stroke and the other end of the bore is open to a control chamber 16 which is formed on the end of the valve body 11. Pressure in the control chamber 16 urges the piston valve 14 back against spring 15 and the strength of the spring is so arranged that if the pressure in the control chamber 16 is half that in the inlet port 12 the valve 14 will assume a mid-position in which neither of the ports 17, 18 which lead from the valve body to the mechanism which is to be controlled, will be in communication with the supply. Any increase in pressure in the control chamber 16 will move the valve 14 against the spring 15 to open the supply to port 18 and any fall of pressure in the control chamber will allow the spring to move the valve in the other direction so as to connect the outlet port 18, which previously received pressure, to exhaust and port 17, which previously was connected to exhaust, to the supply pressure.

In order to control the hydraulic pressure in the control chamber 16 the following electro-magnetic device is provided: Within the control chamber there is secured a polarised electro-magnet. This consists of a permanent magnet 22 which forms the base for the device and is secured to the end wall of the control chamber and two pole pieces 23, 24 secured to the permanent magnet, each of which has two branches. The first branches 25, 26 of the two pole pieces extend towards one another in a direction parallel with the permanent magnet but do not quite meet. The second branches 27, 28 of each pole piece extend towards one another and also do not quite meet, but they are located at a greater distance from the permanent magnet. Between the two pairs of branches there is fixed a flexible armature or reed 30. The reed has a root portion 29 which is at right angles to its length and which is riveted across the gap between the two first branches 25, 26 of the two pole pieces. The main body portion of the reed, which is made of magnetic material, extends through the air gap between the two second branches 27, 28 of the pole pieces and beyond the second gap for some distance. The reed is flat and springy and it is surrounded with an electro-magnet coil 31 which has supply wires 32, 33 extending from its ends to the exterior of the control chamber and a third wire 34 extending from the centre of the winding to the exterior of the chamber.

The end of the reed 30 plays between two opposed nozzles 36, 37 within the control chamber. One nozzle is connected by passage 38 to the supply port 12 of the valve body and the nozzle 37 is connected by passage 39 to the exhaust. The two nozzles 36, 37 are spaced a little from the reed 30 and a spring 35 is provided around the nozzle 37 so as to support the reed from being deflected under the effects of the flow of liquid which takes place from the nozzle 36 to nozzle 37. The area of the aperture of nozzle 36 is made about four times greater than the area of the aperture of nozzle 37. In the absence of any electrical current in the electro-magnet windings the reed is urged by the spring 35 toward the inlet nozzle 36 with sufficient force to keep the pressure in the chamber 16 at about half the supply pressure. The pressure in the control chamber 16 will under these conditions vary more or less proportionately to the force exerted on the reed 30 by the electro-magnet 31.

The utility of the difference in size of the inlet and outlet nozzles may be explained with reference to Figure 2 which illustrates the forces to which the reed 30 may be subjected. In this figure the various forces are represented as follows:

(a) Spring 35 force (S)
(b) Electromagnetic force (F)
(c) Supply pressure ($P_s$)
(d) Tank pressure ($P_t$)
(e) Chamber pressure ($P_c$)

The effective hydraulic pressure upon the reed over the annular area ($A_1-A_2$) is $P_c$. Consequently in order for the mechanism to be sensitive to chamber pressure the area $A_2$ must be smaller than $A_1$.

In the equilibrium state the reed is not subjected to electromagnetic force but it is arranged that the supply pressure $P_s$ acting on the area $A_1$ of the reed is balanced by the spring force S, the chamber pressure $P_c$ acting on the annular area $A_1-A_2$ and by tank pressure $P_t$ acting on area $A_2$. Under these conditions the pressure $P_c$ is arranged to equal half the supply pressure $P_s$ and the following equation holds:

$$P_s A_1 = P_c(A_1-A_2) + P_t A_2 + S$$

If now an electromagnetic force F is applied to the reed in a manner such that the reed tends to move to the left from the equilibrium (piston valve neutral) position the following equation applies:

$$P_s A_1 = P_{c1}(A_1-A_2) + P_t A_2 + S + F$$

In this equation $P_{c1}$ is the new value of the chamber pressure, the value of $P_{c1}$ is lower than $P_c$ owing to the fact that the reed has moved toward the pressure inlet and away from the outlet, and in the new balanced state of the reed, the lower pressure in the chamber will allow the piston valve 14 to move upwardly thereby allowing pressure fluid to pass to one side of the apparatus being controlled. When the desired movement of such apparatus has been achieved, suitable means will automatically cancel out the electrical signal to the electromagnetic means associated with the reed so that force F will be removed and the pressure $P_{c1}$ will rise to pressure $P_c$, such that the piston valve 14 will move to its neutral position.

The force F is proportional to the current applied to the electromagnetic coil. Current is, however, variable according to the desired rate of change of position required in the apparatus being controlled.

If now an electromagnetic force $F_1$ is applied to the reed in a manner such that the reed tends to move to the right from the equilibrium (piston valve neutral) position, the following will apply:

$$P_s A_1 = P_{c2}(A_1-A_2) + P_t A_2 + S - F_1$$

In the above equation $P_{c2}$ is the new value of the chamber pressure and is greater than $P_c$ and in this way the apparatus being controlled will be moved in the opposite sense.

Thus it will be seen that the system relies on a balancing of the forces acting on the reed so that the reed takes up any one of an infinite number of equilibrium positions between the inlet and outlet nozzles.

If the inlet and outlet nozzles were of the same diameter the term involving $P_c$ would disappear from the equations, and the chamber pressure would have no effect upon the reed and consequently the desired balancing would not be achieved. In operation the reed would simply flap straight over from position of contact with one nozzle to a position of contact with the other.

Owing to the polarising effect of the permanent magnet 22 if current is sent through one half of the electromagnet winding from wire 32 to central wire 34, the reed 30 will move towards one of the nozzles, while if current is sent through the other half of the winding from the terminal 33 to the central wire 34 the reed will move towards the other nozzle. The electro-magnet winding being appropriately connected up to a control circuit the effect will be that if one half of the winding is energised the reed will have a force exerted on it tending to move it at least part way toward the nozzle 36 which is connected to the supply and away from nozzle 37 which is connected to the exhaust and the pressure in the control chamber 16 will fall until this force is balanced by the excess of pressure in the supply nozzle over that in the chamber. On the other hand, if the electric current is sent through the other half of the winding the reed 30 will have a force exerted on it tending to move it at least part way toward the exhaust nozzle 37 and the pressure in the control chamber will go up until this force is balanced by the pressure of the spring 35. The piston valve 14 will move in one direction or the other accordingly and whatever hydraulic apparatus is actuated thereby will be caused to move under the pressure in a corresponding direction.

Instead of having nozzles 36, 37 which are opposed to one another on opposite sides of the reed, the reed might carry an extension at right angles to itself which overlies two nozzles pointing upwards from the passages 38, 39. The action is the same.

I claim:

1. An electromagnetic device for controlling a fluid pressure circuit comprising in combination a valve casing, a pressure chamber within the casing, a fluid pressure inlet connection thereto, a fluid pressure outlet connection therefrom, the inlet and outlet connections having ports to the chamber which face one another and the area of the inlet port being several times greater than that of the outlet port, a movable obturating member located between said ports to move to and fro between them, an armature carrying said obturating member, electromagnetic means to operate said armature, spring means to urge the obturating member toward the inlet port thereby tending to balance the force exerted upon it by the incoming fluid, piston means open to the pressure in the pressure chamber so as to be moved thereby, yielding return means therefor, and a sliding fluid pressure control valve operatively connected to the said piston means so that the control valve takes up one of an infinite series of positions dependent upon the amount of current in the electromagnet.

2. An electromagnetic device for controlling a fluid pressure circuit comprising in combination a valve casing, a pressure chamber within the casing a fluid pressure inlet connection thereto, a fluid pressure outlet connection therefrom, the inlet and outlet connections having ports to the chamber which face one another and the area of the inlet port being several times greater than that of the outlet port, a springy reed located between said ports to move to and fro between them, a permanent magnet with pole pieces lying on opposite sides of said reed, an electrical energizing coil surrounding the reed, spring means to urge the end of the reed toward the inlet port thereby tending to balance the force exerted upon it by the incoming fluid, piston means open to the pressure in the pressure chamber so as to be moved thereby, spring return means therefor, and a sliding fluid pressure control valve operatively connected to the said piston means so that the control valve takes up one of an infinite series of positions dependent on the amount of current in the energizing coil.

3. An electromagnetic device for controlling a fluid pressure circuit comprising in combination a valve casing, a pressure chamber within the casing, a fluid pressure inlet connection thereto, a fluid pressure outlet connection therefrom, the inlet and outlet connections having ports to the chamber which face one another and the area of the inlet port being several times greater than that of the outlet port, a springy reed with its end located between said ports to move to and fro between them, a permanent magnet with pole pieces lying on opposite sides of said reed, an electrical energizing coil around the reed which coil is in two sections in which the current flow is in opposite directions, spring means to urge the end of the reed toward the inlet port thereby tending to balance the force exerted upon it by the incoming fluid, piston means open to the pressure in the pressure chamber so as to be moved thereby, spring return means therefor, and a sliding fluid pressure control valve operatively connected to said piston means so that the control valve moves to take up one of an infinite series of positions dependent on the amount and directional sense of current in the energizing coil.

References Cited in the file of this patent

UNITED STATES PATENTS

| | | |
|---|---|---|
| 1,887,322 | Nettleton | Nov. 8, 1932 |
| 2,146,176 | Donaldson | Feb. 7, 1939 |
| 2,269,072 | Wilde | Jan. 6, 1942 |
| 2,292,477 | Ray | Aug. 11, 1942 |
| 2,409,871 | Krogh | Oct. 22, 1946 |
| 2,425,007 | Rouse | Aug. 5, 1947 |
| 2,542,905 | Cromer et al. | Feb. 20, 1951 |
| 2,582,088 | Walthers | Jan. 8, 1952 |
| 2,625,136 | Moog | Jan. 13, 1953 |
| 2,688,253 | Markson | Sept. 7, 1954 |

FOREIGN PATENTS

| | | |
|---|---|---|
| 709,752 | France | May 20, 1931 |